(12) United States Patent
Ackley

(10) Patent No.: US 6,330,974 B1
(45) Date of Patent: Dec. 18, 2001

(54) HIGH RESOLUTION LASER IMAGER FOR LOW CONTRAST SYMBOLOGY

(75) Inventor: H. Sprague Ackley, Seattle, WA (US)

(73) Assignee: Intermec IP Corp., Woodland Hills, CA (US)

( * ) Notice: Subject to any disclaimer, the term of this patent is extended or adjusted under 35 U.S.C. 154(b) by 781 days.

(21) Appl. No.: 08/624,173

(22) Filed: Mar. 29, 1996

(51) Int. Cl.[7] .................................................. G06K 7/10
(52) U.S. Cl. ............................ 235/472.01; 235/462.06; 235/467
(58) Field of Search ............................. 235/467, 472.01, 235/462.06

(56) References Cited

U.S. PATENT DOCUMENTS

| | | |
|---|---|---|
| 3,169,186 | 2/1965 | Howard . |
| 4,408,120 | 10/1983 | Hara et al. . |
| 4,677,285 * | 6/1987 | Taniguchi ............................. 235/488 |
| 4,988,852 | 1/1991 | Krishnan . |
| 5,128,528 | 7/1992 | Heninger . |
| 5,140,146 | 8/1992 | Metlitsky et al. . |
| 5,247,162 | 9/1993 | Swartz et al. . |
| 5,291,028 * | 3/1994 | Droge et al. ......................... 235/472 |
| 5,340,982 * | 8/1994 | Nakazawa ............................ 235/462 |
| 5,378,883 | 1/1995 | Batterman et al. . |
| 5,393,967 | 2/1995 | Rice et al. . |
| 5,463,213 * | 10/1995 | Honda ................................ 235/472 |
| 5,468,950 * | 11/1995 | Hanson ............................... 235/472 |
| 5,475,207 * | 12/1995 | Bobba et al. ........................ 235/467 |
| 5,483,051 * | 1/1996 | Marchi et al. ....................... 235/472 |
| 5,502,297 * | 3/1996 | Sherman .............................. 235/472 |
| 5,504,367 * | 4/1996 | Arackellian et al. ................. 235/472 |

* cited by examiner

Primary Examiner—Harold I. Pitts
(74) Attorney, Agent, or Firm—O'Melveny & Myers LLP

(57) ABSTRACT

An apparatus that permits high resolution imaging of low contrast one and two-dimensional symbols includes a housing having a window and an electro-optical element disposed within the housing behind the window. At least two laser diodes are mounted externally to the housing adjacent to the window. The laser diodes respectively provide beams that intersect at a point within a field of view of the electro-optical element, and the beams provide light to the electro-optical element through the window that has reflected off a symbol positioned at the intersection point. The laser diodes may be selectively or automatically triggered upon the symbol being positioned at the intersection point.

16 Claims, 2 Drawing Sheets

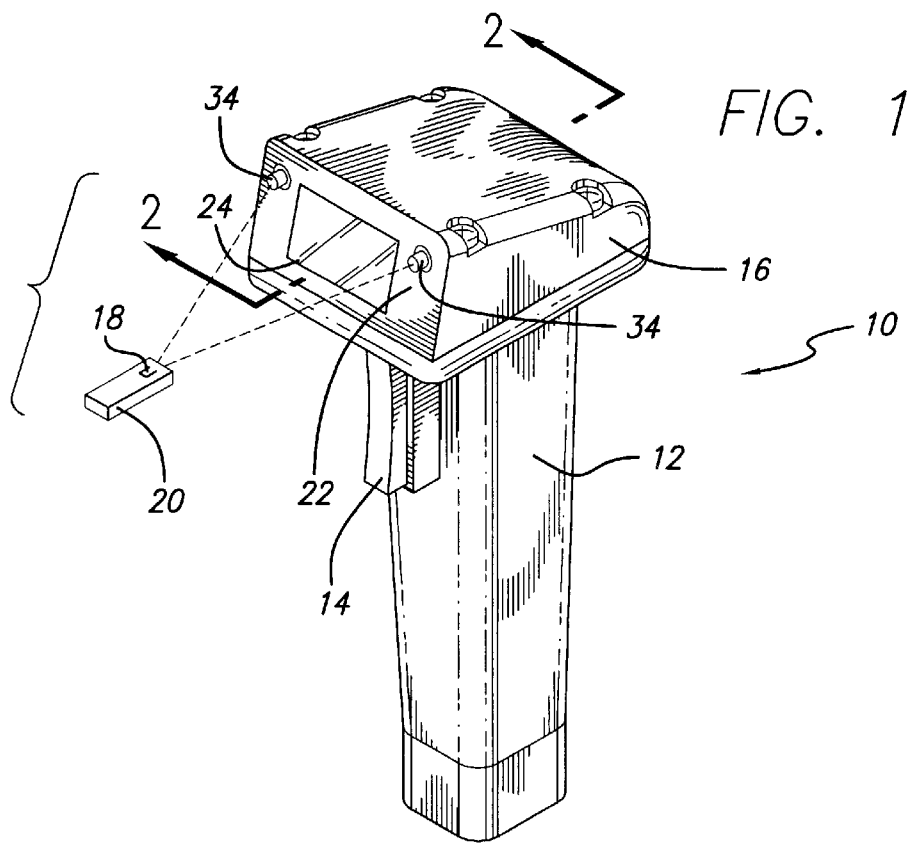
FIG. 1
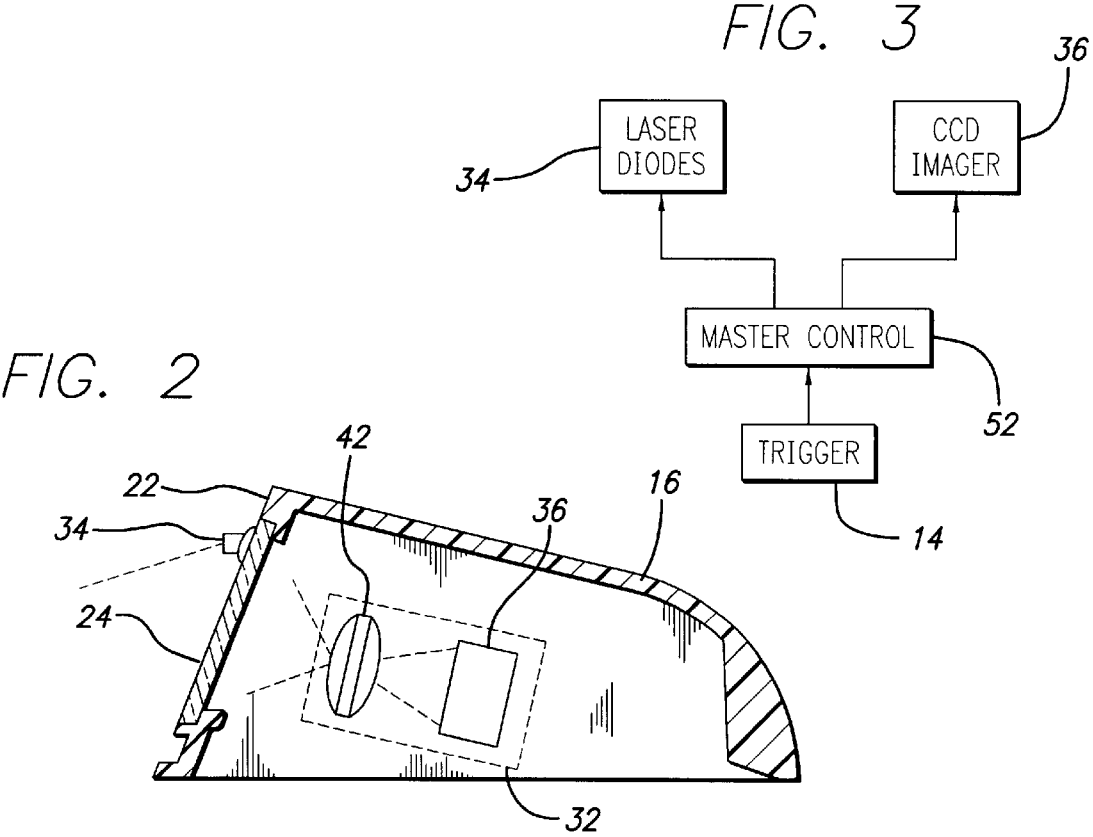
FIG. 3
FIG. 2

HIGH RESOLUTION LASER IMAGER FOR LOW CONTRAST SYMBOLOGY

RELATED APPLICATIONS

The following applications assigned to the same assignee as the instant application have related subject matter to the instant application: (1) Ser. No. 08/215,202 entitled SYMBOLOGY READER WITH FIXED FOCUS SPOTTER BEAM; and (2) Ser. No. 08/255,002 entitled METHOD AND APPARATUS FOR MATRIX SYMBOLOGY IMAGER.

BACKGROUND OF THE INVENTION

1. Field of the Invention

The present invention relates to electro-optical scanners for reading a one or two-dimensional bar code symbology, and more particularly, to a portable or fixed position scanner capable of high resolution imaging in very low contrast symbology environments.

2. Description of Related Art

Optical imaging systems are commonly used to decipher data symbols printed on objects in order to identify the objects. A bar code symbol represents a common one-dimensional form of symbology, and comprises a pattern of vertical bars of various widths separated by spaces of various widths. Since the bar and space elements have different light reflecting characteristics, a reader can convert the symbology into an electrical signal by analyzing the light reflected from the symbol. The electrical signal can then be decoded to provide an alphanumeric representation of the symbol which identifies the object. Bar code symbols of this nature are now in common usage in various applications, such as inventory control, point of sale identification, or logistical tracking systems.

Since the conventional one-dimensional symbology requires a relatively large amount of space to convey a correspondingly small amount of data, so-called two-dimensional bar code symbologies have been developed. A two-dimensional symbology may comprise a matrix that occupies a uniform amount of space having a generally rectangular or square shape. Instead of bars and spaces, round or square characters disposed at particular rows and columns of the matrix correspond to the information being conveyed. As a result, a two-dimensional matrix symbology can compress significantly more data into a given volume of space than a conventional one-dimensional bar code.

In one particular application of a two-dimensional symbology, a small symbol can be placed directly onto items having low surface area, such as electronic components. The two-dimensional symbol could be formed directly onto the ceramic or plastic package of the electronic components by laser etching or other precision machining process. Since a two-dimensional symbology can compress fifty or more characters of data within a relatively small dimensional space, the symbol can store a unique identifier code for the component, including such information as lot or batch number, model number and/or customer code. The symbols can be used to automate the manufacturing or testing processes, and may also enable manufacturers to protect against component theft or forgery.

As known in the art, the two-dimensional symbols are read by scanners that convert the symbols into pixel information, such as described in U.S. Pat. No. 4,988,852 issued to Krishnan. The pixel information is in turn deciphered into the alphanumeric information represented by the symbol. Such scanners often utilize charge-coupled device (CCD) technology to convert optical information from the symbol into an electrical signal representation of the matrix. A light source illuminates the symbol, and light reflected off the symbol is focused onto the surface of the CCD device. The two-dimensional scanners may be provided in a portable device so that they can be brought into close proximity with the item on which the symbol is placed, such as disclosed in U.S. Pat. No. 5,378,883 issued to Batterman et al. The scanner may also be provided in a fixed-position device that images items as they pass by, such as on a production line.

A significant drawback of such etched or machined symbols is that they have very low contrast and, as a result, are difficult to image. Since the symbol characters are formed by shallow cuts into the surface of a component, there is little color difference between the characters and the remaining uncut surface area of the component. To compound this problem, electronic components often have a dull black finish that tends to further obscure the symbol characters. The characters can only be distinguished by the slight difference in shade due to shadows which form in the etched regions, and are often best imaged from an angle. U.S. Pat. No. 5,393,967 issued to Rice et al. discloses a system for reading symbols encoded as a low contrast relief pattern that projects a line of light at a first angle and views the projected light at a second angle. The line of light is swept or scanned across a surface containing the relief pattern, thus requiring relatively complex mechanical or optical systems.

Accordingly, a need exists for a method and apparatus for making high resolution images of very low contrast two-dimensional symbols.

SUMMARY OF THE INVENTION

In accordance with the teachings of the present invention, an apparatus and method that permits high resolution imaging of low contrast symbols is provided.

Particularly, the imaging device includes a housing having a window and an electro-optical element disposed within the housing behind the window. At least two laser diodes are mounted externally to the housing adjacent to the window. The laser diodes respectively provide beams that intersect at a point within a field of view of the electro-optical element, and the beams provide light to the electro-optical element through the window that has reflected off a symbol positioned at the intersection point. The laser diodes may be selectively or automatically triggered upon the symbol being positioned at the intersection point.

Similarly, a method for imaging low contrast symbols using an imaging device comprising a housing and an electro-optical element comprises the steps of positioning a symbol desired to be imaged at a point defined by an intersection of beams originating from at least two laser diodes, illuminating the symbol with light from the beams, and reflecting light from the symbol through the opening onto the electro-optical element. The method may further comprise the step of selectively or automatically triggering the laser diodes to illuminate the symbol.

A more complete understanding of the high resolution laser imager for low contrast symbology will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 1 is a perspective view of an electro-optical scanner of the present invention;

FIG. 2 is a partial sectional side view of the electro-optical scanner, taken through the section 2—2 of FIG. 1;

FIG. 3 is a block diagram illustrating operation of the electro-optical scanner;

DETAILED DESCRIPTION OF THE PREFERRED EMBODIMENT

Figure 4:
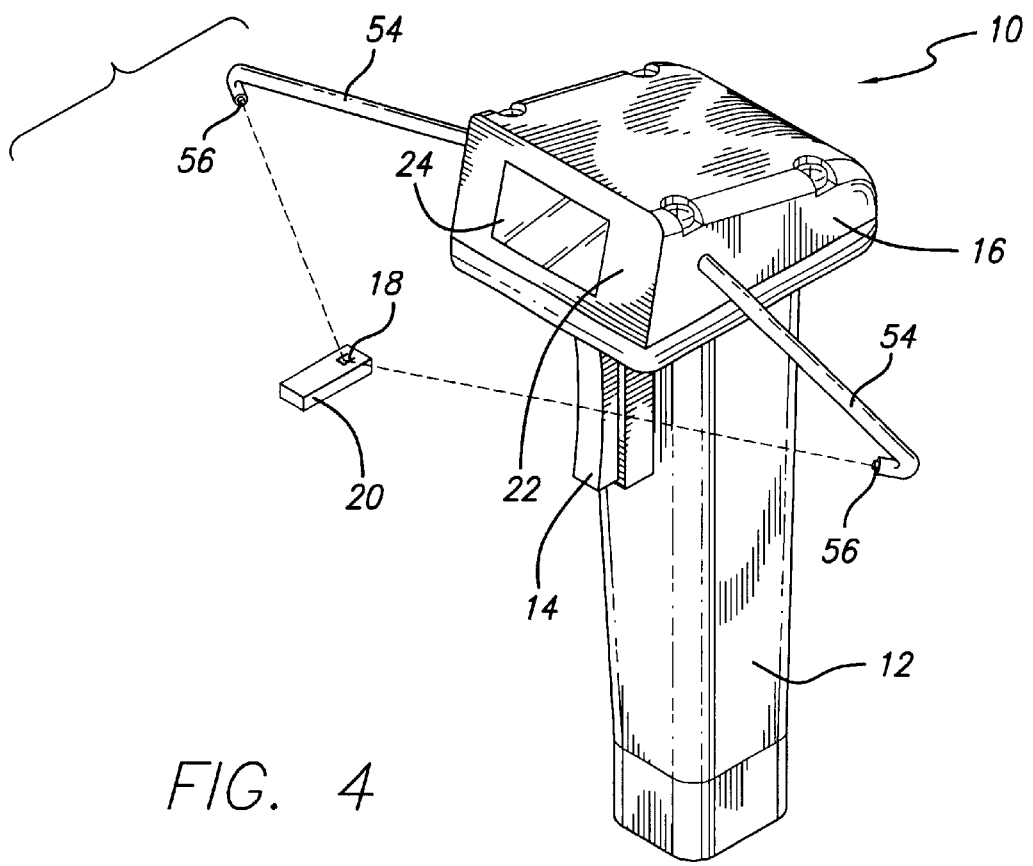
FIG. 4 is a perspective view of an alternative embodiment of an electro-optical scanner.

The present invention satisfies the need for a method and apparatus for making high resolution images of very low contrast two-dimensional symbols. In the detailed description that follows, it should be appreciated that like reference numerals are used to describe like elements illustrated in one or more of the figures.

Referring first to FIG. 1, an electro-optical scanner 10 is illustrated. The electro-optical scanner 10 comprises a housing having a handle portion 12 and a cover portion 16. The handle portion 12 is shaped to conform to an operator's hand, and has a trigger switch 14 that enables the operator to initiate a bar code scanning operation. The handle portion 12 may be substantially hollow to permit circuit components or other elements, such as batteries, to be disposed therein. The cover portion 16 protects the electro-optical imaging elements, as will be described in greater detail below. It is anticipated that the housing be formed of a high strength, light weight material, such as plastic. The handle portion 12 may attach mechanically to the cover portion 16, such as by screws, enabling the cover portion to be removed as desired to provide access to the internal electro-optical imaging elements.

The cover portion 16 includes a front face 22 that defines the imaging direction for the electro-optical scanner 10. The front face 22 includes a window 24 that permits light to be transmitted into and out of the cover portion 16 to the internal electro-optical imaging elements. The window 24 may be substantially parallel to the front face 22, or may be disposed at an angle with respect to the front face. Also, the window 24 may be flush with the front face 22, or may be recessed a short distance from the front face. The window 24 protects the electro-optical imaging elements from any harmful contact or environmental damage, such as due to dirt, dust or moisture, and may be comprised of a clear material, such as glass or plastic.

Referring now to FIG. 2, the internal aspects of the cover portion 16 are illustrated. The scanner 10 comprises an electro-optical element 30 that includes a charge coupled device (CCD) 36 and a lens 42. The electro-optical element 30 may further include apertures or other optical elements (not shown) to alter the field of view and focusing characteristics of the CCD element 36.

In FIG. 1, an exemplary electronic component 20 disposed in close proximity to the scanner 10 is illustrated. The electronic component 20 has a two-dimensional bar code symbol 18 on an exposed surface thereof, which is desired to be imaged by the scanner 10. The bar code symbol 18 has a relatively small area, such as less than one quarter inch square. Due to the small size of the bar code symbol 18, and the low contrast between the respective elements of the bar code symbol, it is necessary to concentrate a high volume of light on the bar code symbol in order to have sufficient depth of field to discern the individual bar code elements.

As shown in both FIGS. 2 and 3, a pair of laser diodes 34 are mounted to the cover 16 at the front face 22 on opposite sides of the window 24. As known in the art, a laser diode is a semiconductor device, usually of the gallium-arsenide type, that emits coherent light when a voltage is applied to its terminals. The laser diodes 34 are specifically oriented so that they produce respective beams that converge inward to intersect at a point directly in front of the window 24 and within a field of view of the CCD element 36. This way, an object disposed at the intersection point can be brightly illuminated by the beams in order to obtain a high resolution image of the object. The laser diodes 34 may have two separate intensity levels, as will be further described below.

The focusing characteristics of the lens 42 can be specifically selected so that the intersection point of the beams from the laser diodes 34 coincides with an optimum focal point of the lens. For example, the lens 42 could define a one-to-one relationship between the distance between the intersection point and the lens, and the distance between the lens and the CCD element 36. Such a one-to-one relationship would greatly simplify scanner design while providing a high depth of field.

Referring now to FIG. 3, a block diagram illustrating functional operation of the scanner 10 is provided. The scanner 10 includes a master control unit 52 that controls operation of the CCD element 36 and the laser diodes 34 based on input signals from the trigger 14. The master control unit 52 may be a microprocessor, digital signal processor, or other digital or analog circuitry. The operator aims the scanner 10 by pointing the front face 22 and the window 24 in the general direction of a symbol that is desired to be imaged (as shown in FIG. 1). In one embodiment, the operator may pull the trigger 14 to a first position for focusing, which illuminates the laser diodes 34 at a first (or lower) intensity level. The crossed beams can also function as a focusing tool, by enabling the operator to position the scanner 10 at the optimum distance from the bar code symbol 18. In this regard, the operator moves the scanner 10 until the intersection point of the beams coincides with the bar code symbol 18. Then, the operator pulls the trigger 14 to a second position, causing the laser diodes 34 to illuminate at a second (or higher) intensity level. Light from the beams reflects off of the symbol 18 through the window 24 and onto the CCD element 36. Then, the CCD element 36 would scan the symbol 18 by converting the reflected light to electrical signals, as known in the art.

In an alternative embodiment, the master control unit 52 could trigger the laser diodes 34 to fire at the higher intensity level automatically when an object is placed at the intersection point between the beams. In yet another embodiment, the laser diodes 34 would only operate at the higher intensity level, and would fire at that level upon the operator pulling the trigger 14. Under either of these embodiments, the laser diodes 34 could be pulsed at the higher intensity level to provide sufficient illumination without compromising any safety restrictions. Even at the higher intensity level, however, the power requirement using conventional laser diodes would still be sufficiently low as to be acceptable in portable operating environments.

Ideally, the laser diodes 34 should be spaced sufficiently far apart and directed at an intersection point sufficiently close to the front face 22 that a relatively shallow angle would be formed between the symbol 18 and the respective beams. For example, the intersection point may be three inches or less from the front face 22. This combination of high intensity light incident at a low angle will uniquely allow the imaging of high density, low contrast symbols.

Referring now to FIG. 4, an alternative embodiment of the electro-optical scanner 10 is illustrated. In the alternative embodiment, a pair of laser diodes 54 are respectively disposed at the ends of respective arms 52 that extend outwardly from sides of the cover 16. The arms 52 may extend outwardly a few inches in order further increase the angle of incidence between the light from the laser diodes 54 and the bar code symbol 18. The arms 52 may be unitarily formed with the cover 16, or may be attachable to respective sockets included in the cover. It should also be apparent that a greater number of arms 52 and laser diodes 54 could also be advantageously utilized, and that the arms 52 could extend outwardly from other surfaces of the cover 16, such as the top surface.

Figure 5:
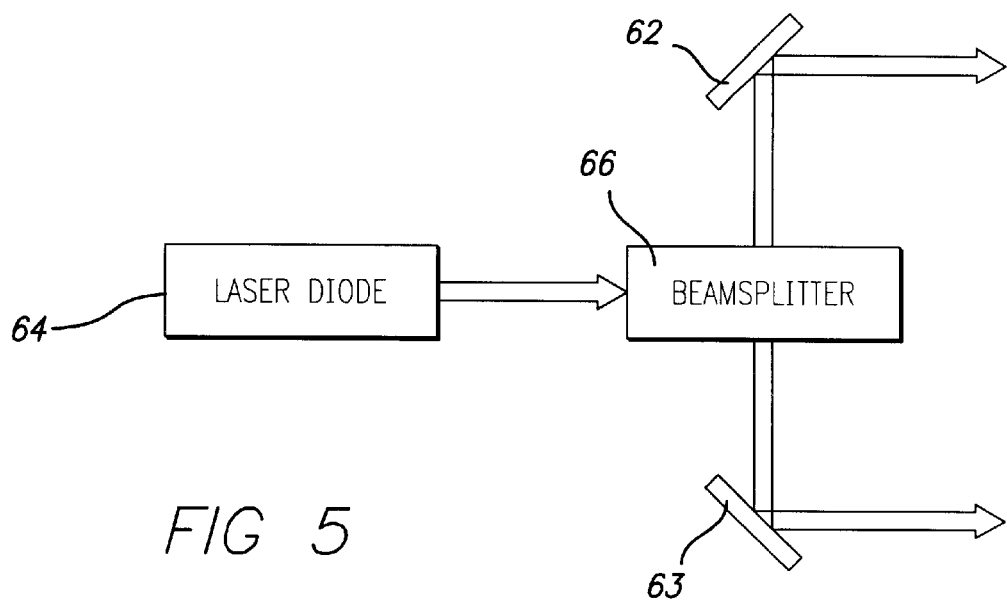
FIG. 5 is a block diagram of a single laser source used to provide two beam emitters.

Though the scanner 10 of the present invention has been illustrated with two laser diodes, it should be appreciated that a greater number of laser diodes (e.g., three, four or five) could also be advantageously utilized to further increase the intensity of light directed to the symbol. Similarly, a single laser diode could also be utilized to illuminate such a symbol, except that some of the focusing and triggering aspects of the invention described above could not be fully realized. Further, a single laser diode 64 could provide laser light that is divided into a plurality of beams by a conventional beamsplitter 66, as shown in FIG. 5. Each of the respective beams would then be directed to the bar code symbol 18 by mirrors 62, 63.

Having thus described a preferred embodiment of the high resolution laser imager for low contrast symbology, it should be apparent to those skilled in the art that certain advantages of the within system have been achieved. It should also be appreciated that various modifications, adaptations, and alternative embodiments thereof may be made within the scope and spirit of the present invention. For example, the scanner 10 has been illustrated as a portable device, but it should be appreciated that a fixed-position scanner could also beneficially utilize the laser diodes to image low contrast symbols in the same manner as the portable device. Such a fixed-position scanner could be utilized on an assembly line in which objects to be imaged are brought into proximity with the scanner.

The invention is further defined by the following claims. What is claimed is:

1. A device for imaging low contrast symbols comprising:
    a housing having a window;
    an electro-optical element disposed within said housing behind said window;
    at least two laser diodes mounted externally to said housing adjacent to said window, said laser diodes respectively providing beams that intersect at a point within a field of view of said electro-optical element, said beams providing light to said electro-optical element through said window that has reflected off a symbol positioned at said intersection point; and
    control means for exciting said at least two laser diodes at a first intensity level to properly focus the electro-optical element on the symbol and at a second intensity level to illuminate the symbol sufficiently for scanning by the electro-optical element.

2. The imaging device of claim 1, further comprising means for triggering said control means to excite said at least two laser diodes at said second intensity level upon said symbol being positioned at said intersection point.

3. The imaging device of claim 1, wherein said electro-optical element further comprises a charged coupled device.

4. The imaging device of claim 1, wherein said electro-optical element further comprises a lens.

5. A device for imaging low contrast symbols comprising:
    a housing;
    an electro-optical element disposed within said housing and visible through an opening in said housing; and
    means for illuminating a singular point within a field of view of said electro-optical element, said illuminating means providing light to said electro-optical element that has reflected off a symbol positioned at said point, said illuminating means further comprising first means for illuminating said point to focus said electro-optical element on said symbol with said light at a first intensity level, and second means for illuminating said point with said light at a second intensity level to permit scanning of said symbol by the electro-optical element.

6. The imaging device of claim 5, wherein said illuminating means further comprises at least one laser diode mounted to said housing providing a beam that intersects said point.

7. The imaging device of claim 5, wherein said illuminating means further comprises a first and a second laser diode mounted to said housing, said beams respectively providing beams that intersect at said point.

8. The imaging device of claim 5, wherein said illuminating means further comprises a plurality of arms extending outwardly from said housing, each of said arms having a laser light source disposed at a respective end thereof.

9. The imaging device of claim 5, wherein said illuminating means further comprises at least one laser diode providing a laser beam, a beamsplitter dividing said laser beam into a plurality of beams, and a plurality of mirrors associated with respective ones of said plurality of beams.

10. The imaging device of claim 5, further comprising means for triggering illumination of said illuminating means at said second intensity level upon said symbol being positioned at said point.

11. The imaging device of claim 5, wherein said electro-optical element further comprises a charged coupled device.

12. The imaging device of claim 5, wherein said electro-optical element further comprises a lens.

13. In an imaging device comprising a housing and an electro-optical element disposed within said housing and visible through an opening in said housing, a method for imaging low contrast symbols comprises:
    positioning a symbol desired to be imaged at a general region defined by an intersection of beams originating from at least two laser diodes;
    illuminating said symbol with light from said beams at a first intensity level to properly focus the electro-optical element on the symbol and at a second intensity level to illuminate the symbol sufficiently for scanning by the electro-optical element; and
    reflecting light from said symbol through said opening onto said electro-optical element.

14. The method of claim 13, further comprising the step of triggering said laser diodes to illuminate said symbol at said second intensity level.

15. A handheld device for imaging low contrast symbols comprising:
    an electro-optical imaging element;
    a plurality of laser emitters spaced from said electro-optical imaging element, said laser emitters each respectively providing beams that intersect at a point within a field of view of said electro-optical imaging element, said beams providing light to said electro-optical imaging element that has reflected off a symbol positioned at said intersection point; and
    control means for exciting said plurality of laser emitters at a first intensity level to properly focus the electro-optical element on the symbol and at a second intensity level to illuminate the symbol sufficiently for scanning by the electro-optical element.

16. The imaging device of claim 15, further comprising means for triggering said control means to excite said plurality of laser emitters at said second intensity level upon said symbol being positioned at said intersection point.

* * * * *